W. H. WHITLOCK.
STARCH BOILERS AND STRAINERS.
No. 181,751. Patented Aug. 29, 1876.
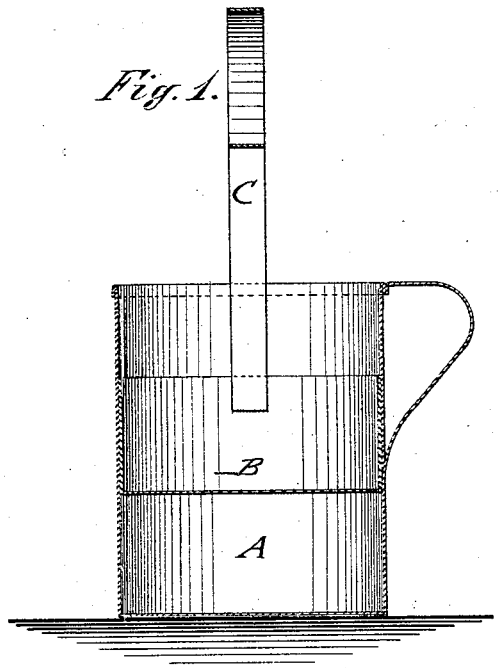
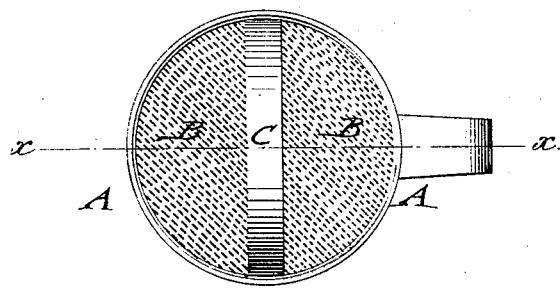
WITNESSES:
H. Rydquist.
John Goethals
INVENTOR:
W. H. Whitlock
BY
Munn/C
ATTORNEYS.

UNITED STATES PATENT OFFICE.

WILLIAM H. WHITLOCK, OF NEW ALBANY, INDIANA.

IMPROVEMENT IN STARCH BOILERS AND STRAINERS.

Specification forming part of Letters Patent No. 181,751, dated August 29, 1876; application filed July 22, 1876.

*To all whom it may concern:*

Be it known that I, WILLIAM H. WHITLOCK, of New Albany, in the county of Floyd and State of Indiana, have invented a new and Improved Starch Boiler and Strainer, of which the following is a specification:

In the accompanying drawing, Figure 1 represents a vertical central section of my improved starch boiler and strainer on line $x\ x$, Fig. 2; and Fig. 2 is a top view of the same.

Similar letters of reference indicate corresponding parts.

The object of my invention is to furnish for household, laundry, and other purposes, an improved starch boiler and strainer, which forms a useful and handy device, as the starch can be strained instantly after boiling without being poured into another vessel, dispensing thereby with straining through a cloth, and burning of hands.

The invention consists of a vessel with interior strainer, sliding therein by a bail attached rigidly to the strainer.

In the drawing, A represents a vessel of suitable size, with handle and bail B, a strainer of wire-gauze, or other material, that is fitted into the vessel A, so as to slide readily into or out of the same. The strainer is put in or removed from the vessel by a rigid bail, C, that is firmly attached to the strainer, extended to suitable height above the vessel, and braced at the upper part.

For making starch, the strainer is removed from the vessel, and the starch and water put into the same for being boiled on the stove. When the starch is ready for use the strainer is placed into the vessel and pushed to the bottom of the same, so that the liquid starch will flow through the strainer while the lumps will be carried to the bottom of the boiler, to remain there with the strainer until the starch above is all used.

The strainer may be used for cold or hot starch, and admits the straining without loss of time, so as to provide an even and liquid starch for the clothes by a simple, convenient, and handy device.

Having thus described my invention, I claim as new and desire to secure by Letters Patent—

The combination of an outer starch-vessel, with a sliding interior strainer, having a fixed operating bail, substantially in the manner and for the purpose set forth.

WILLIAM H. WHITLOCK.

Witnesses:
HENRY STONE,
W. F. FREDERICK.